United States Patent [19]

Askin

[11] 3,806,898

[45] Apr. 23, 1974

[54] REGENERATION OF DYNAMIC MONOLITHIC MEMORIES

[75] Inventor: Haluk O. Askin, Stanfordville, N.Y.

[73] Assignee: International Business Machines Corporation, Armonk, N.Y.

[22] Filed: June 29, 1973

[21] Appl. No.: 375,273

[52] U.S. Cl. .......... 340/173 DR, 307/205, 307/238, 340/173 CA

[51] Int. Cl. .......................... G11c 7/02, G11c 11/24

[58] Field of Search... 340/173 R, 173 DR, 173 CA; 307/238, 205

[56] References Cited

UNITED STATES PATENTS 3,765,003 10/1973 Paivinen ...................... 340/173 DR

*Primary Examiner*—James W. Moffitt
*Assistant Examiner*—Stuart N. Hecker
*Attorney, Agent, or Firm*—Theodore E. Galanthay

[57] ABSTRACT

Disclosed is a regeneration circuit for dynamic monolithic memories, wherein the signal output is very small and must be isolated from external noise during the refresh cycle. The present regeneration circuit includes an isolation transistor between the bit decoder and memory cell eliminating unnecessary bit line charging, reducing power requirements and noise, improving stability of the sense latch and increasing the speed of operation of the memory.

3 Claims, 3 Drawing Figures

REGENERATION OF DYNAMIC MONOLITHIC MEMORIES

CROSS REFERENCE TO RELATED APPLICATIONS AND PATENTS

Dennard, U.S. Pat. No. 3,387,286 issued June 4, 1968 and assigned to the same assignee of the present application.

BACKGROUND OF THE INVENTION

1. Field of the Invention

This invention relates to the regeneration of dynamic monolithic memories and more particularly to the regeneration of dynamic memories in which the memory cell has a relatively small output signal.

2. Description of the Prior Art

Monolithic memories fabricated as data storage circuits or cells on semiconductor substrates are well known in the art. Such semiconductor storage cells may take the form of bistable cross-coupled transistors or charge storage devices and are commonly referred to as one device cells, three device cells, four device cells, etc. depending on the number of transistors required to store one bit of information. The cross referenced Dennard patent relates to a one device cell, requiring only one field effect transistor per bit of information. Such a cell is dynamic in nature requiring periodic regeneration or refreshing before the stored bit of information decays away. Various apparatus and techniques are known in the prior art for refreshing dynamic memory cells. However, with very low signal levels, improved regeneration circuits are desired for refreshing dynamic memory cells having very small signal outputs, these regeneration circuits further dissipating as little power as possible and blocking noise from being coupled to the cells.

SUMMARY OF THE INVENTION

Accordingly, it is a primary object of this invention to provide an improved regeneration circuit for dynamic monolithic memories.

It is another object of this invention to provide such a regeneration circuit with means for preventing noise from being coupled to the storage cells.

It is a still further object of this invention to provide an improved regeneration circuit utilizing minimal power.

In accordance with the present invention, an array of dynamic memory cells arranged in rows and columns is provided. Each row conductor is connected to a plurality of cells, such as 16, for example, such row conductors being referred to as bit lines. In the prior art, it was customary to charge these bit lines to an up level voltage regardless if the cells connected to that particular bit line were to be accessed or not. The regeneration circuit of the present invention includes means for preventing the unnecessary charging of bit lines, thereby preventing noise coupling into the bit line as well as reducing total power dissipation and increasing the cycle/access time of the storage cells. A particular bit line is charged to an up voltage level during write time only if such an up level voltage is to be stored in the storage node of the cell.

Briefly, this is an improved regeneration circuit in a monolithic memory array having dynamic storage cells arranged in rows and columns and requiring periodic generation. An isolation means such as transistor 10 is connected in a series path between a bit line such as bit line B/L2 and node A. Transistor 12 brings node A to a first potential level such as an up potential level one threshold drop below VH. A second transistor 14 also connected to node A is conditioned into conduction by the up level potential. Current through isolation transistor 10 will discharge node A to a second level, such as ground, only if the bit line is at ground. Accordingly, a signal applied to the drain of transistor 14 will bring the bit line to an up level only if it was maintained in a conductive state by the potential at node A.

The foregoing and other objects, features and advantages of the invention will be apparent from the following and more particular description of the preferred embodiment of the invention, as illustrated in the accompanying drawings.

IN THE DRAWINGS

DESCRIPTION OF THE PREFERRED EMBODIMENT

Figure 1:
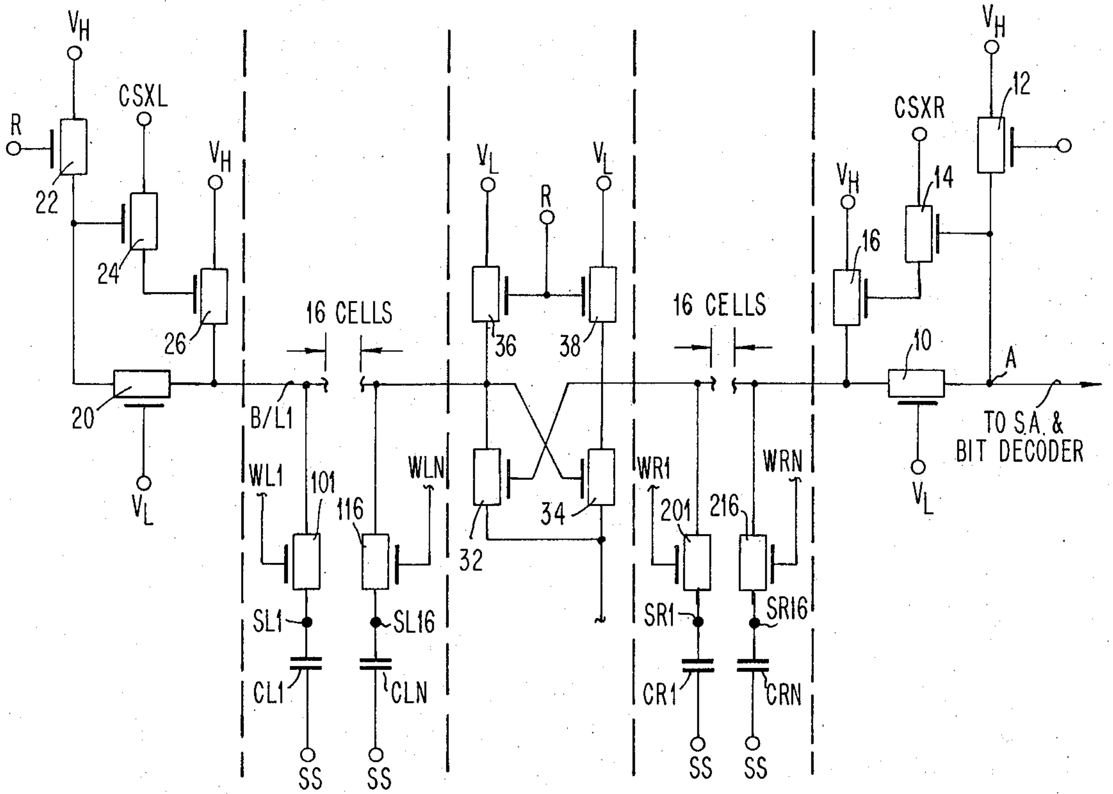
FIG. 1 is a schematic circuit diagram of the preferred embodiment of the invention.

Refer now to FIG. 1 for a description of the regeneration circuit of the present invention. FIG. 1 illustrates an arrangement of one row of memory cells together with an amplifying latch and two sets of regeneration circuits. As illustrated, the row has 32 cells. Each cell consists of one field effect transistor and associated capacitance as fully described in the cross-referenced Dennard patent which is incorporated by reference. A first storage cell consists of field effect transistor 101 and capacitance CL1 connected in series between bit line 1 (B/L1) and the substrate (SS). Signal storage of either an up or down level signal takes place at a storage node SL1 between transistor 101 and capacitor CL1. Transistor 101 has a gating electrode connected to a column conductor herein designated as word line left 1 (WL1) which selectively places transistor 101 in either its high or low conductive state for selectively charging or discharging the storage node SL1 and capacitance CL1. An additional storage cell connected in a series path between B/L1 and the substrate designated as terminal SS is transistor 116, capacitance CLN and storage node SL16. Transistor 116 has a gating electrode connected to column conductor WLN. Those skilled in the art will recognize that any number of storage cells, such as 16, are similarly connectable in series paths between the designated bit line and the substrate. The bit line B/L1 is also connected to an amplifying latch consisting of cross-coupled field effect transistors 32 and 34 having associated gateable load field effect transistors 36 and 38, respectively. The drains of transistors 36 and 38 are connected to VL, a source of potential of approximately +3 volts in the present example. The present preferred embodiment consists of N channel field effect trasistors although this invention is equally applicable to P channel transistors so that the polarity and amplitude of the various potential levels described herein are given only by way of example. Continuing with the description of the latch, each of load transistors 36 and 38 has its gating electrode connected to a terminal R which is a source of restore pulses. The sources of cross-coupled transistors 32 and 34 are connected in common and further to an additional column conductor to be described in greater detail later herein. A bit line B/L2 is connected to the other side of the amplifying latch and an additional 16 storage cells are each connected in series between this bit line and the substrate. Transistor 201 and capacitance CR1 with a storage node SR1 therebetween is connected in a series path between bit line B/L2 and terminal SS while the gating electrode of 201 is connected to a column conductor word line, right one (WR1). Transistor 216 and capacitance CRN are connected in a series path between bit line B/L2 and terminal SS with a storage node SR16 therebetween. The gating electrode of transistor 216 is connected to column conductor WRN. Bit line B/L2 is connected to a regeneration circuit at a common node between transistors 10 and 16.

The regeneration circuit consists of transistors 10, 12, 14, and 16 connected as shown in FIG. 1. Transistor 10 which forms the isolation means of the present invention has its gated electrodes connected in a series path between bit line B/L2 and node A. Node A is selectively connected to either the sense amplifier or write circuit and the bit decoder depending on whether a read or write operation is to take place. It is one of the stated functions of transistor 10 to isolate the bit line from various noise signals at node A. The gating electrode of transistor 10 is connected to the steady state potential VL. Transistor 12 is connected in a series path between node A and potential source VH which in the present example is approximately 8 volts. The gating electrode of transistor 12 is connected to terminal R, the restore pulse source. Transistor 14 has its gating electrode connected to the conductive line joining transistor 12 and node A and has its gated electrodes in a series path between CSXR and the gating electrode of transistor 16. Terminal CSXR refers to chip select X right and will be described in greater detail. Transistor 16 has its gated electrodes connected in a series path between terminal VH and the conductive line joining one of the gated electrodes of transistor 10 to the bit line. This refresh circuit consisting of transistors 10, 12, 14 and 16 regenerates the storage cells connected to bit line B/L2. The storage cells connected to B/L1 are regenerated by the circuit consisting of transistors 20, 22, 24 and 26. These latter four transistors are connected similarly to transistors 10, 12, 14 and 16, respectively. Note the sole distinction which is the connection of the drain of transistor 24 to terminal CSXL referring to chip select X left as opposed to the chip select X right permitting independent refreshing of the cells connected to bit line B/L1 and B/L2.

Figure 2:
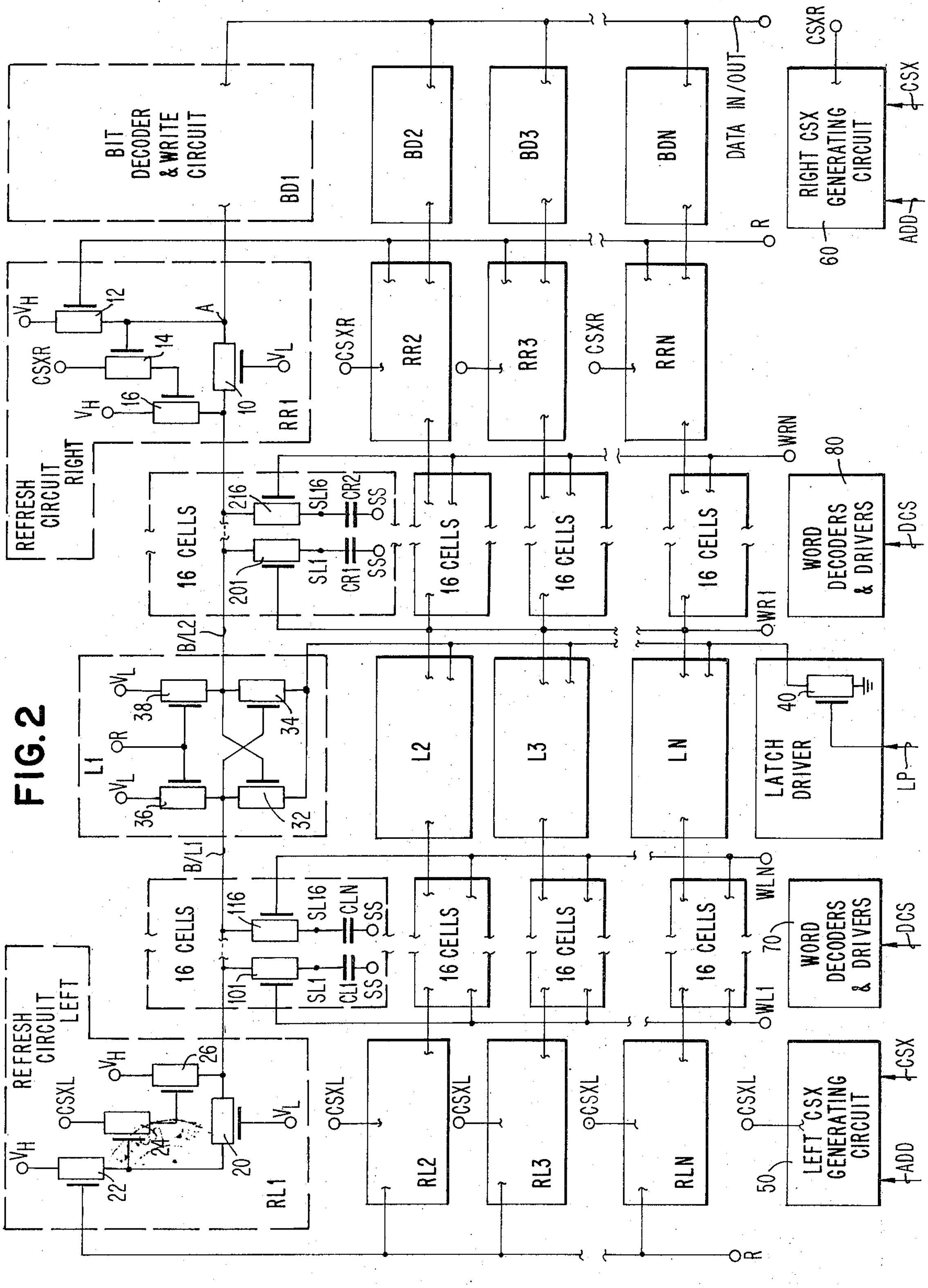
FIG. 2 is a schematic circuit diagram partially in block diagram format illustrating the present invention within an array of memory cells.

Refer now to FIG. 2 which illustrates a semiconductor storage array including a number of circuits as illustrated in FIG. 1. Corresponding elements have been labelled with corresponding reference numerals insofar as possible. Note that FIG. 1 shows the top row of the array including refresh left circuit RL1, latch circuit L1, refresh right circuit RR1, and bit decoder 1, BD1. Additional rows 2, 3, and N have their cells connected to corresponding refresh left RL, latch L, refresh right RR, and bit decoder BD circuits connected to the cells corresponding to that row. Also note the word line column conductors WL1, WLN, WR1 and WRN having a corresponding connection in each of the rows. Also, the regeneration pulse transmitted through terminal R is connected to each of the refresh left RL and refresh right RR terminals. Additionally, the data in/out line is connected to each of the bit decoder BD circuits.

As previously described, the sources of cross-coupled transistors 32 and 34 are connected in common and to a column conductor. The cross-coupled transistors in latch L2, L3, and LN, are also similarly connected to the same column conductor which is in turn connected to latch driver transistor 40. An up level latch pulse LP turns transistor 40 on bringing this particular column conductor to a down level activating all of the latches as will be described in greater detail. In addition to the foregoing, generating circuit 50 is provided for generating the chip select X left (CSXL) pulse. Circuit 50 receives an addressing signal ADD and a chip select X signal CSX. If the left side of the particular array illustrated in FIG. 2 is to be addressed, then both the ADD and CSX inputs are present and a CSXL signal will be applied to the drain of transistor 24 and the corresponding transistor in circuits RL2, RL3 and RLN. Similarly, generating circuit 60 receives an address ADD and a CSX input and provides a CSXR pulse to the drain of transistor 14 etc. if the addressing signal indicates that the right side of array cell shown in FIG. 2 is to be addressed. The DCS signals are delayed chip select signals applied to left word decoders and drivers 70 and right word decoders and drivers 80. Circuit 70 will provide an output on one of lines WL1...WLN in the event that a cell to be addressed occurs in one of the 16 columns on the left side of the array illustrated in FIG. 2. Similarly, circuit 80 provides an up level signal on one of lines WR1...WRN if one of the cells in a column on the right side of the illustrated array circuit is to be accessed. The coincidence of an up level word signal from one of the outputs of either circuit 70 or circuit 80 and a signal from one of the bit decoder and write circuits for a refresh pulse along a row will access a particular bit. It is understood that a plurality of circuits such as shown in FIG. 2 may be "stacked" or placed in parallel, the number of such parallel circuits determining the number of data bits per word in a fixed memory organization.

Operation

Figure 3:
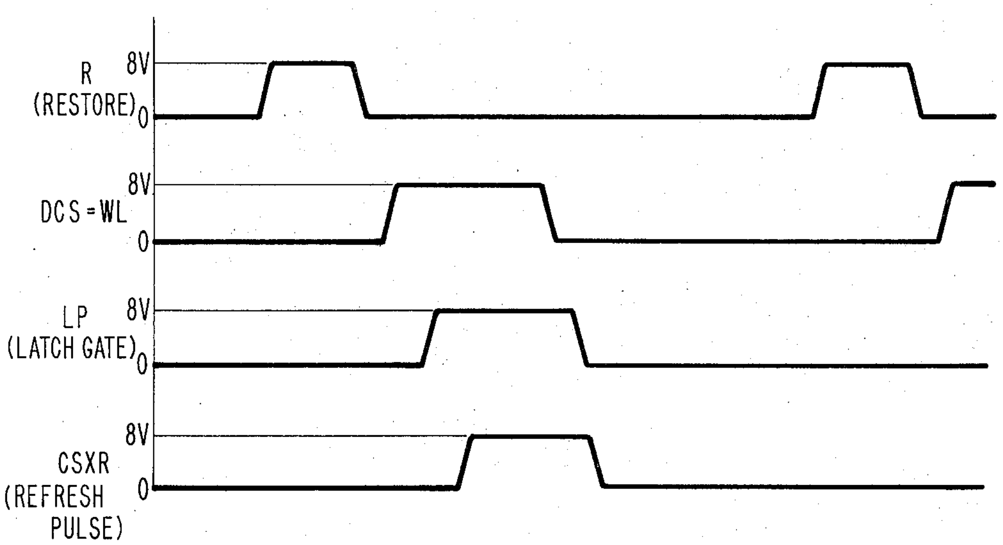
FIG. 3 is a series of waveform diagrams illustrating the operation of the present invention as illustrated in FIGS. 1 and 2.

Refer again to FIG. 1 and also to FIG. 3 for a description of the operation of the preferred embodiment. At time $T=$ zero, all the pertinent waveforms are at their down level such that the transistors which are gated by these waveforms are in their high impedance state or off. The various cell nodes SL1, SL16, SR1, SR16 etc. are either at an up or down potential level depending on the digital value of the information signal that is stored. The bit lines are either at an up or down level depending on the nature of the last preceding operation. For example, if a down level (binary zero) was last read from transistor 201, then bit line B/L2 would tend to be at a down level at time $T=$ zero. Note that if this convention (down level being a binary zero) is established on the right side of the circuit along bit line B/L2, then the opposite convention applies in the left side of the circuit along bit line B/L1. This is necessary since an inversion takes place through the latch and the same convention is desired to be maintained at node A.

After time $T$=zero, the first waveform to occur is the restore R pulse. This turns transistors 12 and 22 on bringing the gates of transistors 14 and 24 to a up level. This up level is one threshold drop below VH in the range of 5–6 volts. The restore pulse R applied to the gating electrode of transistors 36 and 38 brings the bit lines to VL volts, there being no threshold drop through transistors 36 and 38 since the R pulse has an up level of approximately 8 volts maintaining a sufficient gate to source differential to bring the bit lines to VL, which is approximately 3 volts. The gating means such as transistor 10, for example, having its gating electrode nominally biased to a potential no greater than the potential of the bit line maintains a gate to source potential sufficiently low to keep transistor 10 off and preventing fluctuations at node A from being transmitted to the bit line.

In accordance with the timing diagram in FIG. 3, the next pulse to occur is a word line pulse applied to the gating electrode of one of transistors 101, 116, 201, 216, or etc. If the corresponding storage node was at a down level, the corresponding bit line will charge the associated capacitance lowering the bit line potential by approximately 300 millivolts to 2.7 volts, for example. Conversely, if the storage node was storing an up level signal, the capacitance will charge the bit line up approximately 300 millivolts to approximately 3.3 volts. Shortly after the occurrence of the delayed chip select DCS (word line) pulse, the latch pulse LP occurs turning transistor 40 on bring the source electrodes of cross coupled transistors 32 and 34 to a down level. Thus, for purposes of illustration, assume that storage node SL1 stored an up level signal such that when transistor 101 was turned on by the word line pulse bit line B/L1 was brought to 3.3 volts conditioning the gating electrode of transistor 34 to a slightly higher potential than the 3 volts applied to the gating electrode of transistor 32. Then, when the LP pulse brings the source electrodes of both transistors 32 and 34 to a down level, a well-known race condition is established and since the gating electrode of transistor 34 is biased to a slightly more conductive level, it will conduct fully bringing bit line B/L2 to a down level turning transistor 32 fully off. In this condition, bit line B/L1 is latched to a down level near 3 volts while bit line B/L2 is latched to a down level near ground which may be sensed through transistor 10 at node A by a sense amplifier if a read operation is desired. The next pulse to occur is chip select X (CSX). This pulse is gated with a particular desired address in one of circuits 50 or 60 to produce a CSXL or CSXR pulse. In this particular example, transistor 101 having been selected, the CSXL pulse will come to an up level. Since the gating electrode of transistor 24 was previously brought to an up level, and since bit lines B/L1 remained at 3 volts thereby not discharging the up potential at the gating electrode of transistor 24, the up level CSXL pulse turns transistor 26 on bringing bit line B/L1 to almost a full up level (one threshold drop below VH) by current passing through transistor 26. Note that the bit line could be fully brought to VH with an appropriate bootstraping capacitor joining the gate and source of transistor 24.

Similarly, if it is desired to charge bit line B/L2 to an almost full up level, the CSXR pulse comes to an up level turning transistor 16 on through transistor 14 and since the word line pulse is still up at this point, the storage node is recharged to its desired up level. The foregoing describes the regeneration and read operation. If it is desired to write into any one of the indicated storage cells, node A is brought to an up or down level as desired. Assuming that a down level is to be written into node SR1 through transistor 201, then node A is brought to a down level bringing bit line B/L2 to a down level, this operation taking place prior to the occurrence of the LP pulse. When the LP pulse occurs, bit line B/L2 is latched to a down level, this down level being stored in node SR1. In the alternative, if it is desired to store a down level in one of the storage nodes in the left side of the array such as node SL1, then node A is brought to an up level such that bit line B/L2 is brought to an up level turning transistor 32 on, and bringing bit line B/L1 to a down level at the occurrence of LP pulse. This is in conformance with the earlier described effect of polarity inversion through the latch.

It is very important to note that in the case where a bit line such as bit line B/L1 is brought to a down level because of a particular binary signal either to be written into or read from one of the associated storage nodes, then the gating electrode of transistor 24 is brought to a down level so that at the occurrence of the CSXL pulse, it is not transmitted through transistor 24. Similarly, if bit line B/L2 were brought to a down level, node A is discharged, this being connected to the gating electrode of transistor 14 keeps transistor 14 off at the occurrence of the CSXL pulse. Thus, the isolation transistors such as transistor 10 not only isolate the bit line from unwanted signals at node A, but also pass current when desired in order to either sense the contents of one of the storage nodes or to provide a feedback gating signal to a transistor such as transistor 14 for preventing the unnecessary charging of the bit line. Transistor 10 accomplishes this function without a separate gating signal but rather by having its gate electrode biased to a potential near the nominal potential of the bit line. In the prior art, without the regeneration circuit disclosed herein, both bit lines were conditioned to an up level regardless of need. This unnecessary charging resulted in excessive power dissipation. The present memory cycle is shortened because the CSX pulse can occur while the word line pulse is still at an up level. Previously, this word line pulse had to be brought to a down level in order to prevent an up level from being stored in the storage node when a down level was desired.

While the invention has been particularly shown and described with reference to a preferred embodiment thereof, it will be understood by those skilled in the art that varous changes in form and details may be made therein without departing from the spirit and scope of the invention.

What is claimed is:

1. In a monolithic memory array having dynamic storage cells arranged in rows and columns, and requiring periodic regeneration, an improved regeneration circuit comprising:

isolation means connected in a series path between a bit line and a node;

first means for bringing said node to a first potential level;

second means are connected to said node, conditioned into conduction by said first potential level;

a current through said isolation means bring the potential of said node to a second level only if said bit line is at said second level; and a signal applied to said second means for bringing said bit line to said first level only if that second means was maintained in a conductive state by the potential at said node.

2. A circuit as in claim 1 wherein said isolation means is a transistor having two gated electrodes and a gating electrode, said gating electrode being connected to a steady state potential.

3. A circuit as in claim 1 further comprising:

a third means connected between said second means and said bit line and responsive to the output of said second means for transmitting said output potential level to said bit line.

* * * * *